United States Patent [19]

Nilssen

[11] Patent Number: 5,159,245
[45] Date of Patent: Oct. 27, 1992

[54] TRACK LIGHTING SYSTEM FOR 277 VOLT POWER LINE

[76] Inventor: Ole K. Nilssen, Caesar Dr., Rte. 5, Barrington, Ill. 60010

[21] Appl. No.: 789,800

[22] Filed: Nov. 12, 1991

Related U.S. Application Data

[63] Continuation of Ser. No. 511,951, Apr. 16, 1990, abandoned, which is a continuation of Ser. No. 889,746, Jul. 28, 1986, abandoned, which is a continuation-in-part of Ser. No. 667,691, Nov. 2, 1984, which is a continuation-in-part of Ser. No. 487,817, Apr. 22, 1983, Pat. No. 4,506,318.

[51] Int. Cl.$^5$ .......................................... H05B 37/00
[52] U.S. Cl. ...................... 315/206; 315/210; 315/DIG. 7
[58] Field of Search ............... 315/210, 206, 70, 312, 315/205, 224, DIG. 4;DIG. 5, DIG. 7; 339/21 R, 22 R; 363/132

[56] References Cited

U.S. PATENT DOCUMENTS

| | | | |
|---|---|---|---|
| 2,587,169 | 2/1952 | Kivari | 315/70 |
| 3,496,518 | 2/1970 | Neumann et al. | 339/21 R |
| 4,051,413 | 9/1977 | Abadie | 315/219 |
| 4,127,795 | 11/1978 | Knoll | 315/210 |
| 4,207,497 | 6/1980 | Capewell et al. | 315/96 |
| 4,207,498 | 6/1980 | Spira et al. | 315/DIG. 4 |
| 4,353,009 | 10/1982 | Knoll | 315/220 |
| 4,441,054 | 4/1984 | Bay | 315/DIG. 4 |
| 4,506,318 | 3/1985 | Nilssen | 363/98 |

FOREIGN PATENT DOCUMENTS 2281539 7/1974 France .................... 315/70

*Primary Examiner*—Eugene R. LaRoche
*Assistant Examiner*—A. Zarabian

[57] ABSTRACT

In a track lighting system for a 277 volt power line, proper voltage for powering 120 volt incandescent lamps is obtained by way of an integral electronic transformer-less voltage conditioner. Thus, ordinary 120 volt incandescent lamps can be used directly in the power tracks of this track lighting system, the voltage conditioner includes a full-bridge rectifier providing an unfiltered DC supply voltage consisting of sinusoidally-shaped unidirectional voltage pulses having an RMS magnitude of 277 volt. This DC supply voltage is provided to a half-bridge inverter; which, as long as it is in operation, provides a high-frequency output voltage of RMS magnitude equal to half of the RMS magnitude of the DC supply voltage. However, by arranging for the inverter to operate only during part of each of the DC voltage pulses provided from the full-bridge rectifier, the RMS magnitude of the inverter's output voltage can readily be arranged to have an RMS magnitude somewhat lower than half of 277 volt —such as 120 volt, since the major part of the voltage-magnitude-reduction is accomplished by way of the half-bridge inverter action itself—which action naturally provides for a halving of the voltage magnitude—the resulting power factor of the power drawn by the track lighting system from the 277 volt power line is excellent.

17 Claims, 2 Drawing Sheets

TRACK LIGHTING SYSTEM FOR 277 VOLT POWER LINE

This is a continuation of Ser. No. 06/511,951 filed Apr. 16, 1990, now abandoned; which was a continuation of Ser. No. 06/889,745 filed Jul. 28, 1986, now abandoned; which was a continuation-in-part of Ser. No. 06/667,691 filed Nov. 2, 1984; which was a continuation-in-part of Ser. No. 06/487,817 filed Apr. 22, 1983, now U.S. Pat. No. 4,506,318.

BACKGROUND OF THE INVENTION

1. Field of Invention

The present invention relates to a track lighting system adapted to be powered from a 277 Volt power line, yet—by way of an electronic voltage conditioner—operative to provide 120 Volt voltage on the power track, thereby permitting the use therein of ordinary 120 Volt incandescent lamps.

2. Prior Art

For reasons of cost-effectivity, electric power distribution in commercial buildings is preferably accomplished by way of a 277 Volt distribution voltage.

However, if a track lighting system is installed, it is necessary to use a distribution voltage of 120 Volt RMS magnitude; otherwise, it would be necessary to use very special incandescent light bulbs in the power tracks and/or to provide a very special voltage-magnitude-transformation means between the 277 Volt power line and the power tracks.

In commercial lighting systems where the predominant lighting means are gas discharge lamps, the distribution voltage or choice is 277 Volt. However, in combination with a gas discharge lighting system it is frequently necessary to provide for incandescent track lighting as well. Yet, available incandescent lamps are designed for operation on 120 Volt; which implies the necessity in such situations of providing for some sort of voltage-magnitude-transformation means. In present 277 Volt installations, voltage-magnitude-transformation means for incandescent lamps are provided in the form of 60 Hz voltage step-down transformers. However, within economically realistic limits, such transformers are highly inefficient and very heavy.

SUMMARY OF THE INVENTION

Objects of the Invention

An object of the present invention is that of providing a track lighting system operable to be powered by a relatively high-magnitude voltage, such as 277 Volt, yet being cost-effectively operative to properly power lamps designed to operate on a relatively low-magnitude voltage, such as 12 or 120 Volt.

More specifically, an object of the present invention is that of providing a track lighting system powered from a 277 therein of incandescent lamps designed for operation on 120 Volt.

These, as well as other objects, features and advantages of the present invention will become apparent from the following description and claims.

BRIEF DESCRIPTION

In its preferred embodiment, the present invention is a track lighting system adapted to be powered from a 277 Volt AC power line and operative to provide on its power tracks proper voltage for powering ordinary 120 Volt incandescent lamps.

The 120 Volt power track voltage is obtained by way of an integral electronic transformer-less voltage conditioner. This voltage conditioner includes a full-bridge rectifier providing an unfiltered DC supply voltage consisting of sinusoidally-shaped unidirectional voltage pulses having an RMS magnitude of 277 Volt. In fact, the instantaneous magnitude of this DC supply voltage is substantially equal to that of the 277 Volt AC voltage.

The DC supply voltage is provided to a half-bridge inverter; which, as long as it is in operation, provides a high-frequency (i.e., about 30 kHz) output voltage of RMS magnitude equal to half that of the DC supply voltage. By arranging for the inverter to operate only during part of each of the unidirectional voltage pulses provided from the full-bridge rectifier, the RMS magnitude of the inverter's output voltage can readily be adjusted to have an RMS magnitude somewhat lower than half of 277 Volt—such as 120 Volt.

Since the major part of the voltage-magnitude-reduction is accomplished by way of the half-bridge inverter action itself—which action naturally provides for a halving of the voltage magnitude of the inverter's AC output voltage as compared with that of its DC supply voltage—the resulting power factor of the power drawn from the 277 Volt power line is excellent: better than 85%. Moreover, the overall efficiency is very much better than that attainable with ordinary 60 Hz transformers: on the order of 95% or better.

Since the frequency of the 120 Volt power track voltage is relatively high (:.e., about 30 kHz), it becomes cost-effectively feasible to use 12 Volt Tungsten-Halogen lamps in the system's track lighting units. The 12 Volt RMS required for properly powering these Tungsten-Halogen lamps is obtained by way of very compact and highly efficient high-frequency ferrite transformer means.

DESCRIPTION OF THE PREFERRED EMBODIMENT

Details of Construction

Figure 1:
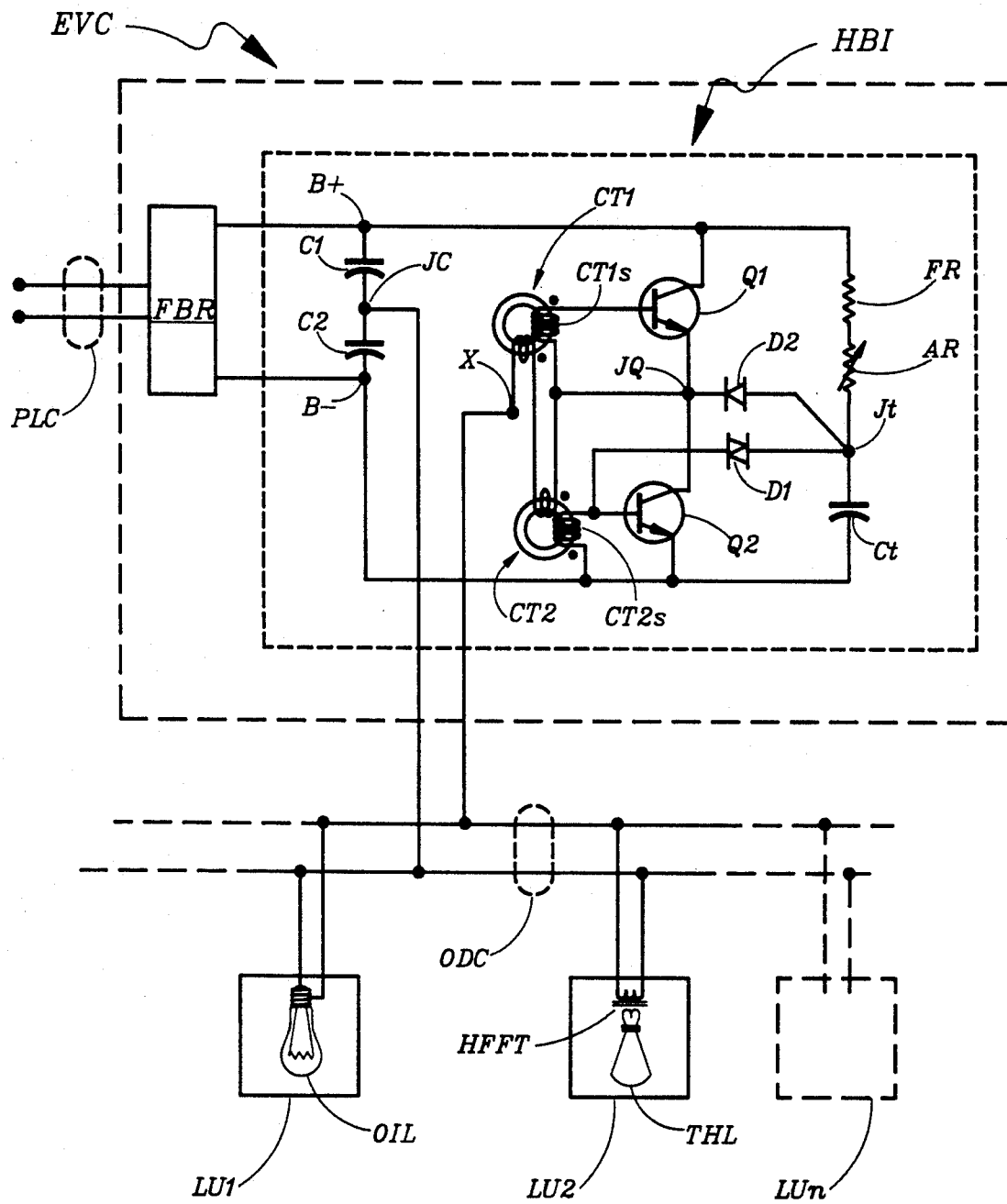
FIG. 1 provides a basic electrical circuit diagram of the preferred embodiment of the invention.

FIG. 1 schematically illustrates the electrical circuit arrangement of subject track lighting system.

An electronic voltage conditioner EVC is connected with power line conductors PLC of a 277 Volt/60 Hz power line, and provides an output of 120 Volt/30 kHz across a pair of output and distribution conductors ODC.

A number of 120 Volt lighting units LU1, LU2 ... LUn are connected with output and distribution conductors ODC.

Lighting unit LU1 consists of an ordinary 120 Volt incandescent lamp OIL, and lighting unit LU2 consists of a 12 Volt Tungsten-Halogen lamp THL connected with conductors ODC by way of a high-frequency ferrite transformer HFFT.

Within electronic voltage conditioner EVC, a full-bridge rectifier FBR is connected with the 277 Volt/60 Hz power line conductors (PLC) and provides its rectified output across a B+ bus and a B− bus, with the B+ bus being of positive polarity.

A half-bridge inverter HBI is connected with the B+ bus and the B− bus; and the 120 Volt/30 kHz output from this inverter is provided across output and distribution conductors ODC.

Within half-bridge inverter HBI, connected between the B+ bus and a junction JC, is a first capacitor C1; and connected between junction JC and the B− bus is a second capacitor C2.

Connected with the B+ bus and a junction JQ are the collector and the emitter, respectively, of a first transistor Q1; and, similarly, connected with junction JQ and the B− bus are the collector and the emitter, respectively, of a second transistor Q2.

Secondary winding CT1s of saturable current transformer CT1 is connected between the base and the emitter of transistor Q1; and secondary winding CT2s of saturable current transformer CT2 is connected between the base and the emitter of transistor Q2. The primary windings of current transformers CT1 and CT2 are connected in series between a point X and junction JQ.

A fixed resistor FR is connected in series with an adjustable resistor AR to form a series-combination; and this series-combination is connected between the B+ bus and a junction Jt. A capacitor Ct is connected between junction Jt and the Bbus; a Diac D1 is connected between junction Jt and the base of transistor Q2; and a diode D2 is connected with its anode to junction Jt and with its cathode to junction JQ.

Output and distribution conductors ODC are connected between junction JC and point X.

Figure 2:
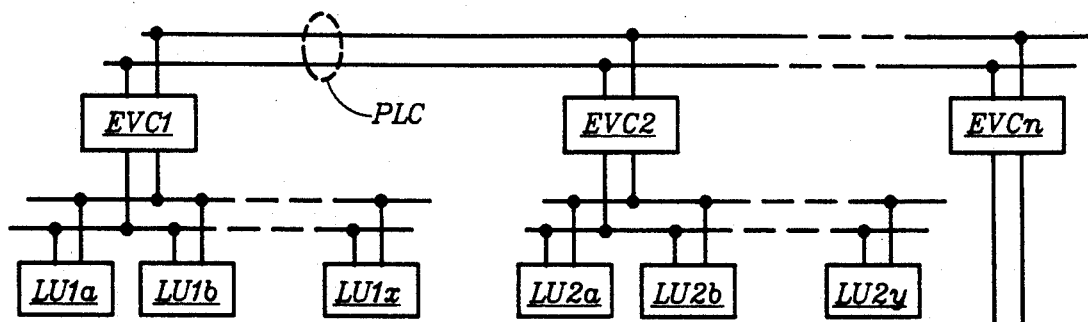
FIG. 2 provides a schematic diagram of a larger-scale lighting system constructed in accordance with the present invention.

FIG. 2 illustrates a situation where a plurality of electronic voltage conditioners EVC1, EVC2 . . . EVCn are each connected with a single pair of 277 Volt/60 Hz power line conductors PLC. Connected with EVC1 are lighting units LU1a, LU1b . . . LU1x; connected with EVC2 are lighting units LU2a, LU2b . . . LU2y; and connected with EVCn by way of power track PTn are lighting units LUna, LUnb . . . LUnz.

Figure 3:
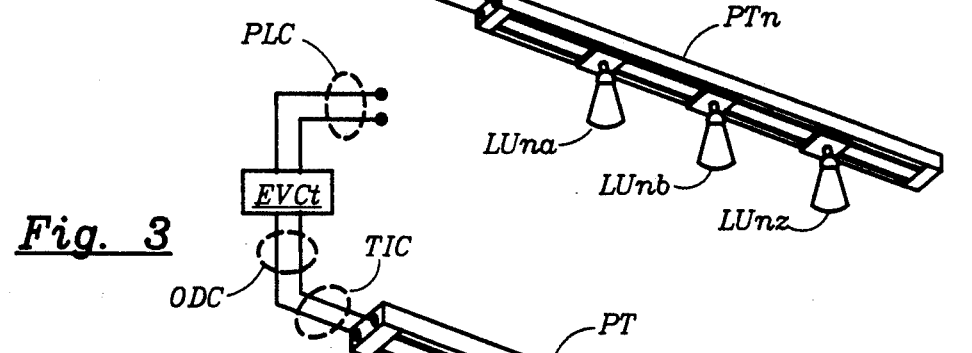
FIG. 3 illustrates a first track lighting system constructed in accordance with the present invention.

FIG. 3 illustrates more specifically a track lighting system wherein an electronic voltage conditioner EVCt is powered from 277 Volt/60 Hz power line conductors PLC and provides a 120 Volt/30 kH output by way of a pair of output and distribution conductors ODC to a pair of track input conductors TIC to a power track PT having a track receptacle slot TRS, into which track receptacle slot are inserted a number of track lighting units TLU1, TLU2 . . . TLUm.

Figure 4:
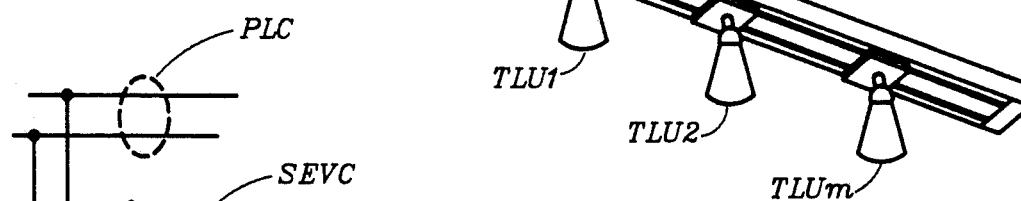
FIG. 4 illustrates a second track lighting system constructed in accordance with the present invention.
Figure 4:
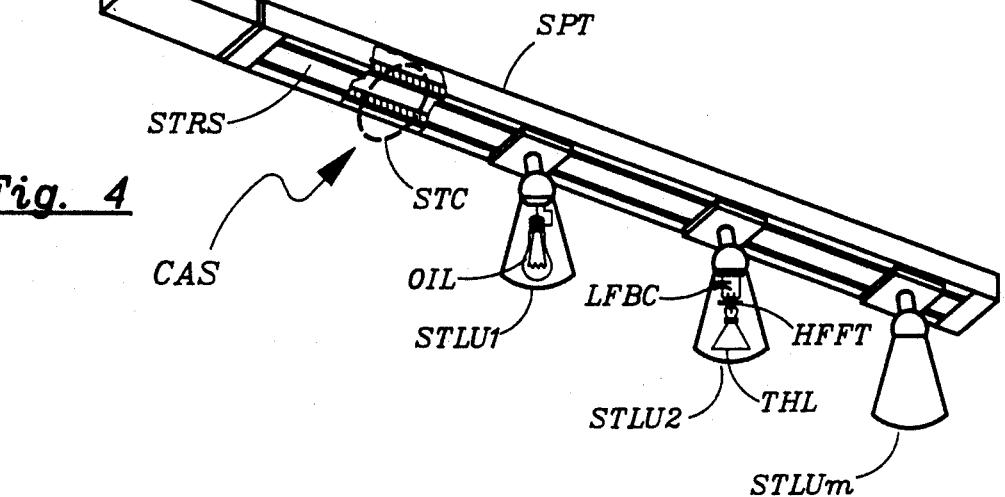

FIG. 4 illustrates an arrangement wherein a special electronic voltage conditioner SEVC has been integrated with a special power track SPT, thereby to render this special power track operable to connect directly with 277 Volt/60 Hz power line conductors PLC and to provide 120 Volt/30 kHz on its special track conductors STC; which special track conductors are shown in cut-away section CAS of the special power track. Inserted into and held by a special track receptacle slot STRS of this special power track are special track lighting units STLU1, STLU2 . . . STLUm. Special track lighting unit STLU1 comprises an ordinary 120 Volt incandescent lamp OIL adapted to connect directly with special track conductors STC. Special track lighting unit STLU2 comprises a 12 Volt Tungsten-Halogen lamp THL connected with special track conductors STC by way of high-frequency ferrite transformer HFFT and low-frequency blocking capacitor LFBC.

Details of Operation

In FIG. 1, the 277 Volt/60 Hz power line voltage provided from the power line conductors (PLC) are full-wave-rectified in the full-wave rectifier (FWR) and provided to the B+/B− terminals in the form of unfiltered full-wave-rectified 277 Volt/60 Hz voltage. Thus, the DC voltage provided between the B+ bus and the B− bus consists of unidirectional sinusoidally-shaped voltage pulses occurring at the rate of 120 per second. In other words, the instantaneous magnitude or the DC supply voltage is substantially equal to the instantaneous absolute magnitude of the 277 Volt/60 Hz power line voltage.

Detailed operation of the half-bridge inverter (HBI) is explained in U.S. Pat. No. 4,506,318 to Nilssen.

In particular, the two series-connected transistors (Q1/Q2) in combination with the two series-connected capacitors (C1/C2) and the two feedback current transformers (CT1/CT2) act as a 30 kHz self-oscillating half-bridge inverter; which inverter is powered by the unfiltered full-wave-rectified 277 Volt/60 Hz power line voltage.

This inverter is of a type that needs to be triggered into oscillation, and that drops out of oscillation whenever the B+ voltage falls below a given relatively low magnitude.

Hence, near the end of each individual pulse of the full-wave-rectified 277 Volt/60 Hz DC supply voltage, the inverter ceases oscillation; and it then has to be re-triggered to start oscillation again.

The time constant associated with resistors FR and AR as combined with capacitor Ct can be adjusted such as to cause the capacitor to reach a voltage-magnitude high enough to cause the Diac (D1) to trigger at substantially any position during each individual pulse of the unfiltered DC voltage. By adjusting the resistance value of AR, the trigger point can be adjusted over a wide range; which means that the RMS magnitude of the inverter's output voltage can be correspondingly adjusted to nearly any RMS value lower than that present when triggering occurs at the very beginning of each pulse of the DC supply voltage.

It is noted that the instantaneous absolute magnitude of the voltage provided at the inverter's output—i.e., the output provided between junction JC and point X—is substantially equal to half that of the DC supply voltage. Thus, as long as it is oscillating, the half-bridge inverter (HBI) acts to reduce the RMS magnitude of the DC supply voltage by a factor of two.

In other words, since the RMS magnitude of the DC supply voltage is substantially equal to that of the 277 Volt/60 Hz power line voltage, as long as the inverter indeed oscillates, the RMS magnitude of the output of the half-bridge inverter (HBI) is substantially equal to half that of the 277 Volt/60 Hz power line voltage; which is to say that it will be equal to about 138.5 Volt as long as the inverter oscillates in a substantially continuous mode.

However, by suitably delaying the point at which the inverter is triggered into oscillation at the beginning of each sinusoidally-shaped unidirectional voltage pulse of the DC supply voltage, a further reduction of the RMS magnitude of the inverter's output can readily be attained.

Specifically, by delaying the trigger point approximately 65 degrees, the net RMS magnitude of the inverter output voltage will be reduced to approximately 120 Volt.

The net overall power factor resulting from this amount of phase delay is about 88%; which is to say that to reduce the RMS magnitude from 138.5 Volt (half of 277 Volt) to 120 Volt (by way of phase-control similar to that used in a Triac-type light dimmer) results in a power factor of about 88%.

Additional Comments a) In view of the explanation of the operation of the arrangement of FIG. 1, the operation of the arrangements illustrated in FIGS. 2-4 is substantially self-explanatory.

b) Since the frequency of the output voltage from the halfbridge inverter (30 kHz) is so very much higher than the 60 Hz on the power line, any power transformer for changing the RMS magnitude of the 120 Volt/30 kHz inverter output voltage becomes very small and inexpensive. This particular fact is taken into account by showing one of the lighting units (LU2 of FIG. 1 or STLU2 of FIG. 4) as having a 12 Volt Tungsten-Halogen lamp powered by way of a 30 kHz 120 Volt-to-12 Volt ferrite transformer.

c) Of course, the reduction from 277 Volt RMS to 120 Volt RMS may be accomplished directly by way of a light-dimming-type approach—such as by using a Triac. However, the resulting power factor would then be less than 44% or so (i.e., equal to the ratio of 120 to 277); which generally would be considered unacceptably low.

d) With a distribution voltage of 240 Volt RMS magnitude, there is no need for RMS magnitude-reduction beyond that which is attained directly by way of the half-bridge inverter; in which case the resulting power factor will be just about 100%.

e) With an efficiency of about 99% for the full-bridge rectifier (FBR) and about 98% for the half-bridge inverter (HBI), the overall output-to-input efficiency of the electronic voltage conditioner (EVC) is about 97%.

f) Since the efficiency is so very high, and since no power transformer is used, the overall size of the complete electronic voltage conditioner (EVC) can be very small: small enough to be integrally included as element SEVC of the special power track (SPT) in the special track lighting system of FIG. 4.

g) If an overall power factor of 88% should in some situations prove to be inadequate, increased power factor can readily be attained by providing for a very small 30 kHz autotransformer between the output of the half-bridge inverter (HBI) and the output/distribution conductors (ODC), and arranged such as to yield a slightly reduced-magnitude voltage to the ODC.

h) By providing for light-responsive feedback to control the firing angle of the half-bridge inverter, it is readily possible to maintain constant the RMS magnitude provided to the output/distribution conductors (ODC) regardless of significant changes in the RMS magnitude of the 277 Volt/60 Hz power line voltage.

i) It is noted that the capacitance of capacitors C1 and C2 of FIG. 1 need only be adequate to provide for a fairly low impedance path for currents of 30 kHz frequency; which implies that they can be very compact of size.

j) The fact that a half-bridge inverter operates in such manner as to provide an output voltage having an instantaneous magnitude that is substantially equal to half that of the DC supply voltage, might be understood by recognizing that in such an inverter the load means is connected between a center-tap of the DC supply (i.e., the junction JC between capacitors C1 and C2 in FIG. 1) and a point (X in FIG. 1)) that is alternatingly connected with the B+ bus and the B− bus.

k) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. A track lighting system comprising:
    a source providing a low-frequency AC voltage at a pair of power line terminals; the low-frequency AC voltage having a fundamental period consisting of two half-periods;
    a power track having a pair of track conductors as well as a receptacle slot operable to receive and hold track lighting units with socket terminals operative to make electrical contact with the track conductors; and
    voltage conditioning means connected between the power line terminals and the truck conductors; the voltage conditioning means being operative, but only during a part of each half-period, to provide a high-frequency AC voltage to the track conductors; the fundamental frequency of the high-frequency AC voltage being substantially higher than that of the low-frequency AC voltage; all during said part of each half-period, the instantaneous absolute magnitude of the high-frequency AC voltage being substantially equal to half that of the low-frequency AC voltage;
    whereby the RMS magnitude of the high-frequency AC voltage is less than half that of the low-frequency AC voltage.

2. The track lighting system of claim 1 wherein the voltage conditioning means includes a full-wave rectifier means as well as a half-bridge inverter means.

3. The track lighting system of claim 1 wherein the magnitude of the low-frequency AC voltage is about 277 Volt RMS and the magnitude of the high-frequency AC voltage is about 120 Volt RMS.

4. The track lighting system of claim 1 wherein, during said part of each half-cycle, intermittent periodic ohmic contact is made between one of the power line terminals and one of the track conductors.

5. The track lighting system of claim 1 wherein, during said part of each half-cycle, current may flow directly between one of the power lien terminals and one of the track conductors.

6. The track lighting system of claim 11 wherein the waveform of the high-frequency AC voltage is square-wave.

7. A track lighting system comprising:
    a source providing a low-frequency AC voltage at a pair of power line terminals;
    a power track having a pair of track conductors as well as a receptacle slot operable to receive and hold track lighting units with socket terminals operative to make electrical contact with the track conductors; and voltage conditioning mans connected between the power line terminals and the track conductors; the voltage conditioning means being operative to provide a high-frequency AC voltage to the track conductors; the fundamental frequency of the high-frequency AC voltage being very much higher than that of the low-frequency AC voltage; the high-frequency AC voltage being amplitude-modulated, thereby varying periodically between being of a relatively low magnitude and being of a relatively high magnitude; the relatively high magnitude being several times larger than the relatively low magnitude.

8. The track lighting system of claim 7 wherein the high-frequency AC voltage is a squarewave voltage.

9. The track lighting system of claim 7 wherein, during at least a part of each fundamental period of the low-frequency AC voltage, intermittent periodic ohmic contact is made between one of the power line terminals and one of the track conductors.

10. The track lighting system of claim 7 wherein, during at least a part of each fundamental period of the low-frequency AC voltage, current flow directly between one of the power line terminals and one of the track conductors.

11. The track lighting system of claim 7 wherein: (i) a track lighting unit is indeed connected with the track conductors: (ii) the voltage conditioner means includes a full-bridge reactifier connected directly with the power line terminals; and (iii) the voltage conditioners means draws power from the power line terminals with a power factor about equal to or higher than 80%.

12. The track lighting system of claim 7 wherein the high-frequency AC voltage is 100% amplitude-modulated.

13. The track lighting system of claim 12 wherein the high-frequency AC voltage is amplitude-modulated at a frequency equal to twice the frequency of the low-frequency AC voltage.

14. A track lighting system comprising:

a source providing a low-frequency AC voltage at a pair of power line terminals;

a power track having a pair of track conductors as well as a receptacle slot operable to receive and hold track lighting units with socket terminals operative to make electrical contact with the track conductors; and voltage conditioning means connected between the power line terminals and the track conductors; the voltage conditioning means including a full-bridge rectifier and an inverter means; the full-bridge rectifier being connected directly with the power line terminals and being operative to supply rectified unfiltered low-frequency AC voltage to the inverter means; the voltage conditioning means being operative;

(i) to provide an amplitude modulated high-frequency AC voltage to the track conductors; the fundamental frequency of the high-frequency AC voltage being very much higher than that of the low-frequency AC voltage;

(ii) to power track lighting units connected with the track conductors; and (iii) to draw power from the power line terminals with a power factor of at least 80%.

15. The track lighting system of claim 14 wherein the inverter means includes a half-bridge inverter.

16. The track lighting system of claim 14 wherein the high-frequency AC voltage is a squarewave voltage.

17. A track lighting system comprising:

a source providing a low-frequency AC voltage at a pair of power line terminals;

a power track having a pair of track conductors as well as a receptacle slot operable to receive and hold track lighting units with socket terminals operative to make electrical contact with the track conductors; and voltage conditioning means connected between the power line terminals and the track conductors; the voltage conditioning means being operative to provide an amplitude modulated high-frequency squarewave voltage to the track conductors; the fundamental frequency of the high-frequency squarewave voltage being substantially higher than that of the low-frequency AC voltage.

* * * * *

US005159245C1

(12) EX PARTE REEXAMINATION CERTIFICATE (6188th)

United States Patent
Nilssen

(10) Number: US 5,159,245 C1
(45) Certificate Issued: Apr. 15, 2008

(54) TRACK LIGHTING SYSTEM FOR 277 VOLT POWER LINE

(76) Inventor: Ole K. Nilssen, Caesar Dr., Rte. 5, Barrington, IL (US) 60010

Reexamination Request:
No. 90/007,670, Aug. 16, 2005

Reexamination Certificate for:
Patent No.: 5,159,245
Issued: Oct. 27, 1992
Appl. No.: 07/789,800
Filed: Nov. 12, 1991

Related U.S. Application Data

(63) Continuation of application No. 07/511,951, filed on Apr. 16, 1990, now abandoned, which is a continuation of application No. 06/889,746, filed on Jul. 28, 1986, now abandoned, which is a continuation-in-part of application No. 06/667,691, filed on Nov. 2, 1984, now abandoned, which is a continuation-in-part of application No. 06/487,817, filed on Apr. 22, 1983, now Pat. No. 4,506,318.

(51) Int. Cl.
*H02M 7/5383* (2006.01)
*H05B 39/00* (2006.01)
*H05B 39/04* (2006.01)

(52) U.S. Cl. .................. 315/206; 315/DIG. 7; 315/210

(58) Field of Classification Search ............ None
See application file for complete search history.

(56) References Cited

U.S. PATENT DOCUMENTS

| 4,104,715 A | 8/1978 | Lawson |
| 4,164,014 A | 8/1979 | Crowe |
| 4,233,545 A | 11/1980 | Webster |
| 4,414,617 A | 11/1983 | Galindo |
| 4,502,107 A | 2/1985 | Nilssen |
| 4,506,318 A | 3/1985 | Nilssen |
| 4,591,764 A | 5/1986 | Nilssen |
| 5,083,255 A | 1/1992 | Nilssen |

OTHER PUBLICATIONS

General Electric Controlled Rectifier Manual, First Ed. (1960), Chap. 7, pp. 82–105; Chap. 8, pp. 106–143.
Motorola Semiconductor Power Circuits Handbook, First Edition (1968), Chap 1 pp. 1–18—1–23 and Chap. 2 pp. 2–1—2–65.
Motorola Application Note AN–199 "A Solid–State 15kHz Power Inverter," by Jack Takesuye (1967).
Motorola Application Note AN–222 "The ABC's of DC to AC Inverters" revised by Robert J. Haver (1972).

*Primary Examiner*—James Menefee

(57) ABSTRACT

In a track lighting system for a 277 volt power line, proper voltage for powering 120 volt incandescent lamps is obtained by way of an integral electronic transformer-less voltage conditioner. Thus, ordinary 120 volt incandescent lamps can be used directly in the power tracks of this track lighting system, the voltage conditioner includes a full-bridge rectifier providing an unfiltered DC supply voltage consisting of sinusoidally-shaped unidirectional voltage pulses having an RMS magnitude of 277 volt. This DC supply voltage is provided to a half-bridge inverter; which, as long as it is in operation, provides a high-frequency output voltage of RMS magnitude equal to half of the RMS magnitude of the DC supply voltage. However, by arranging for the inverter to operate only during part of each of the DC voltage pulses provided from the full-bridge rectifier, the RMS magnitude of the inverter's output voltage can readily be arranged to have an RMS magnitude somewhat lower than half of 277 volt—such as 120 volt, since the major part of the voltage-magnitude-reduction is accomplished by way of the half-bridge inverter action itself—which action naturally provides for a halving of the voltage magnitude—the resulting power factor of the power drawn by the track lighting system from the 277 volt power line is excellent.

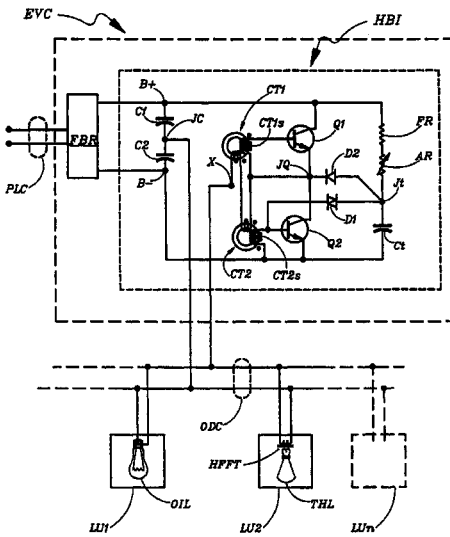

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7, 14 and 17 are determined to be patentable as amended.

Claims 2–6, 8–13 and 15–16, dependent on an amended claim, are determined to be patentable.

1. A track lighting system comprising:
a source providing a low-frequency AC voltage at a pair of power line terminals; the low-frequency AC voltage having a fundamental period consisting of two half-periods;
a power track having a pair of track conductors as well as a receptacle slot operable to receive and hold track lighting units with socket terminals operative to make electrical contact with the track conductors; and
voltage conditioning means *including a half-bridge inverter* connected between the power line terminals and the [truck] *track* conductors; the voltage conditioning means being operative, but only during a part of each half-period, to provide a high-frequency AC voltage to the track conductors; the fundamental frequency of the high-frequency AC voltage being substantially higher than that of the low-frequency AC voltage; all during said part of each half-period, the instantaneous absolute magnitude of the high-frequency AC voltage being substantially equal to half that of the low-frequency AC voltage;
whereby the RMS magnitude of the high-frequency AC voltage is less than half that of the low-frequency AC voltage.

7. A track lighting system comprising:
a source providing a low-frequency AC voltage at a pair of power line terminals;
a power track having a pair of track conductors as well as a receptacle slot operable to receive and hold track lighting units with socket terminals operative to make electrical contact with the track conductors; and
voltage conditioning [mans] *means including a half-bridge inverter* connected between the power line terminals and the track conductors; the voltage conditioning means being operative to provide a high-frequency AC voltage to the track conductors; the fundamental frequency of the high-frequency AC voltage being very much higher than that of the low-frequency AC voltage; the high-frequency AC voltage being amplitude-modulated, thereby varying periodically between being of a relatively low magnitude and being of a relatively high magnitude; the relatively high magnitude being several times larger than the relatively low magnitude.

14. A track lighting system comprising:
a source providing a low-frequency AC voltage at a pair of power line terminals;
a power track having a pair of track conductors as well as a receptacle slot operable to receive and hold track lighting units with socket terminals operative to make electrical contact with the track conductors; and
voltage conditioning means connected between the power line terminals and the track conductors; the voltage conditioning means including a full-bridge rectifier and [an] *a half-bridge* inverter means; the full-bridge rectifier being connected directly with the power line terminals and being operative to supply rectified unfiltered low-frequency AC voltage to the inverter means; the voltage conditioning means being operative;
(i) to provide an amplitude modulated high-frequency AC voltage to the track conductors; the fundamental frequency of the high-frequency AC voltage being very much higher than that of the low-frequency AC voltage;
(ii) to power track lighting units connected with the track conductors; and
(iii) to draw power from the power line terminals with a power factor of at least 80%.

17. A track lighting system comprising:
a source providing a low-freqency AC voltage at a pair of power line terminals;
a power track having a pair of track conductors as well as a receptacle slot operable to receive and hold track lighting units with socket terminals operative to make electrical contact with the track conductors; and
voltage conditioning means *including a half-bridge inverter* connected between the power line terminals and the track conductors; the voltage conditioning means being operative to provide an amplitude modulated high-frequency squarewave voltage to the track conductors; the fundamental frequency of the high-frequency squarewave voltage being substantially higher than that of the low-frequency AC voltage.

* * * * *